(12) United States Patent
Gunda et al.

(10) Patent No.: US 11,403,011 B1
(45) Date of Patent: Aug. 2, 2022

(54) HOST MEMORY BUFFER ALLOCATION MANAGEMENT

(71) Applicant: WESTERN DIGITAL TECHNOLOGIES, INC., San Jose, CA (US)

(72) Inventors: Sridhar Prudvi Raj Gunda, Karnataka (IN); Santhosh Kumar Siripragada, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/222,565

(22) Filed: Apr. 5, 2021

(51) Int. Cl.
*G06F 3/06* (2006.01)
*G06F 12/02* (2006.01)

(52) U.S. Cl.
CPC .......... *G06F 3/0631* (2013.01); *G06F 3/0604* (2013.01); *G06F 3/0656* (2013.01); *G06F 3/0673* (2013.01); *G06F 12/0253* (2013.01); *G06F 12/0292* (2013.01)

(58) Field of Classification Search
CPC .... G06F 3/0604; G06F 3/0631; G06F 3/0656; G06F 3/0673
See application file for complete search history.

(56) References Cited

U.S. PATENT DOCUMENTS

| | | | |
|---|---|---|---|
| 9,720,597 B2 | 8/2017 | Li et al. | |
| 9,880,783 B2 | 1/2018 | Sela et al. | |
| 10,613,778 B2 | 4/2020 | Hahn et al. | |
| 2018/0089076 A1* | 3/2018 | Li | G06F 3/0665 |
| 2019/0146709 A1 | 5/2019 | Im et al. | |
| 2020/0050391 A1* | 2/2020 | Meyerowitz | G06F 3/0656 |
| 2020/0133566 A1 | 4/2020 | Kim et al. | |

OTHER PUBLICATIONS

K. Kim, E. Lee and T. Kim, "HMB-SSD: Framework for Efficient Exploiting of the Host Memory Buffer in the NVMe SSD," in IEEE Access, vol. 7, pp. 150403-150411, 2019, doi: 10.1109/ACCESS.2019.2947350. (Year: 2019).*
J. Hong, S. Han and E. Chung, "A RAM cache approach using host memory buffer of the NVMe interface," 2016 International SoC Design Conference (ISOCC), 2016, pp. 109-110, doi: 10.1109/ISOCC.2016.7799757. (Year: 2016).*

* cited by examiner

*Primary Examiner* — Khoa D Doan
(74) *Attorney, Agent, or Firm* — ArentFox Schiff LLP

(57) ABSTRACT

Aspects of a storage device including a memory and a controller are provided. The memory includes a volatile memory. The controller can determine that at least a portion in the volatile memory is a reusable region based on a host memory allocation from a host device. The controller also can calculate a size of the reusable region in the volatile memory. The controller also can perform one or more storage device operations in the reusable region of the volatile memory in response to the host memory allocation based on the calculated size of the reusable region. Thus, the controller may provide smart handling of host memory buffer allocation, thereby improving storage device read performance.

20 Claims, 12 Drawing Sheets

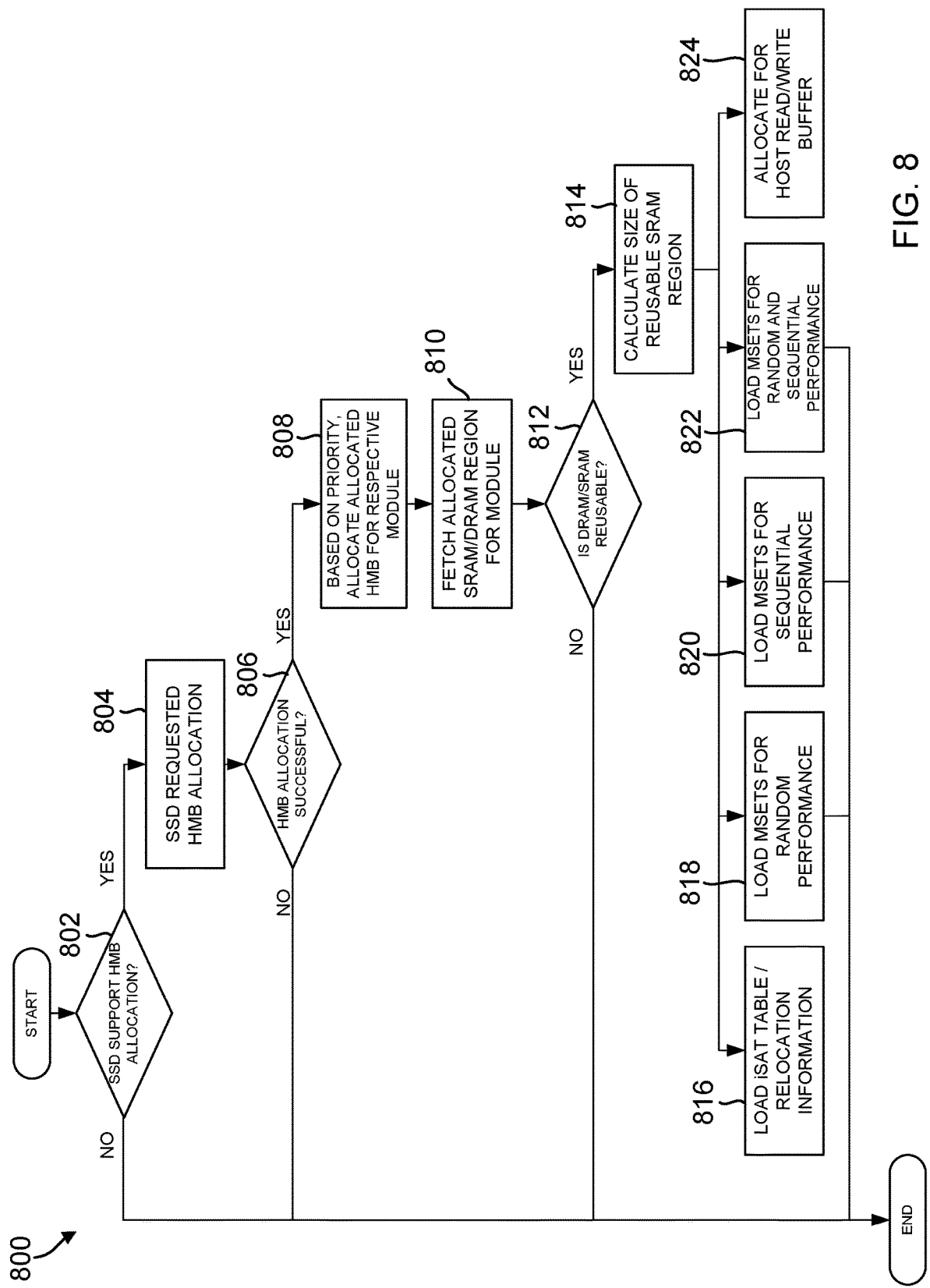

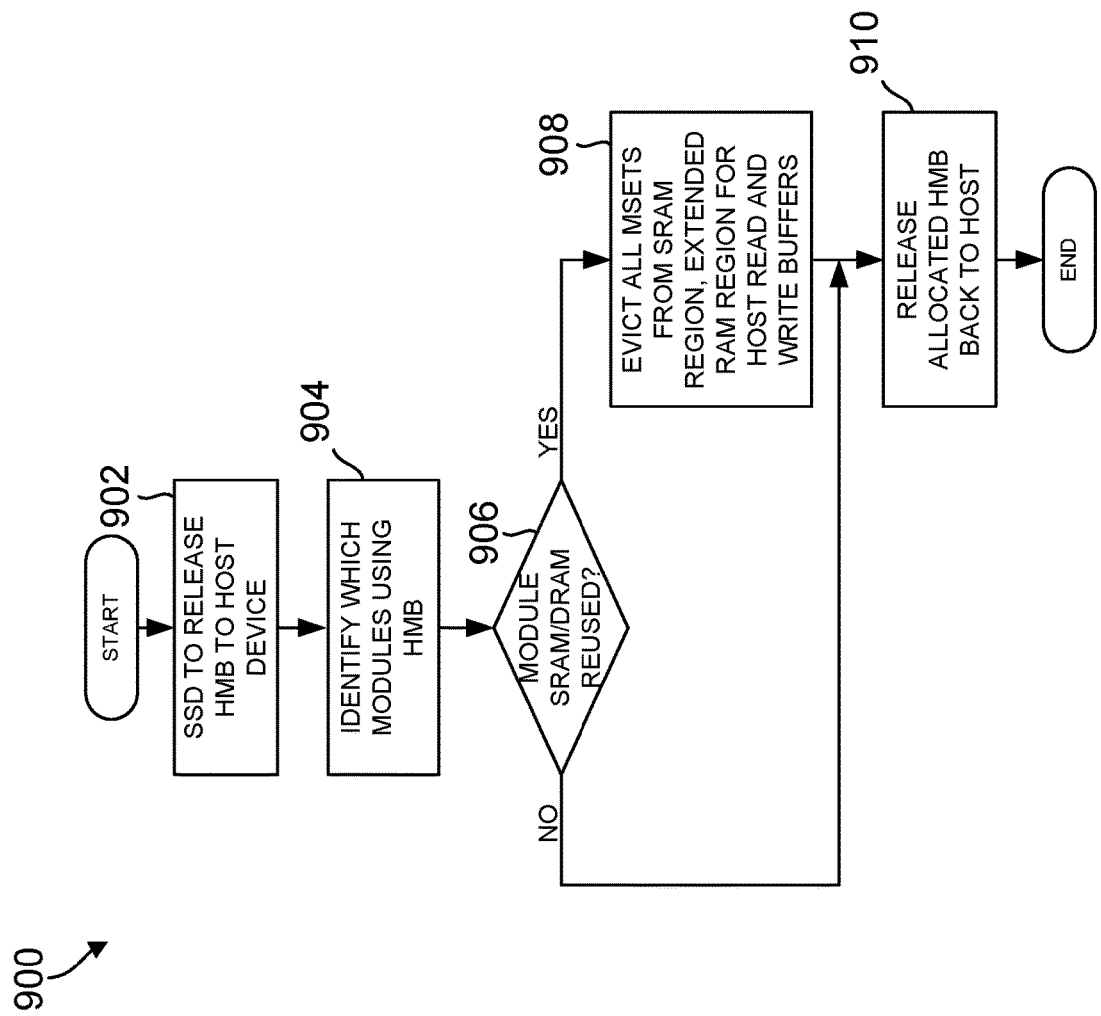

HOST MEMORY BUFFER ALLOCATION MANAGEMENT

BACKGROUND

Field

This disclosure is generally related to electronic devices and more particularly to storage devices.

Introduction

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like. Typically, a non-volatile memory system has a memory controller that controls access of a host system to non-volatile memory in the memory system. The host system may be a computer system, cellular telephone, server, etc. The non-volatile memory system and host system may exchange data over, for example, a Peripheral Component Interconnect Express (PCIe) bus. Non-volatile Memory Express (NVMe) is a logical device interface specification for accessing non-volatile storage attached via a PCIe bus. NVMe takes advantage of parallelism offered by semiconductor memory such as, but not limited to, SSDs.

The memory controller can typically have some amount of volatile memory, which it may use for a variety of tasks. For example, the volatile memory can be used to cache a portion of a management table that is used to translate between logical addresses used by the host system and physical addresses in the non-volatile memory. Note that a full version of the management table may be stored in the non-volatile memory. A benefit of caching the management table is that when the memory system receives a read or write request, it can determine which memory location needs to be accessed based on a much quicker lookup in the memory controller's volatile memory. For fast consistent performance, the organization of the management table may be chosen to minimize the amount of computation and number of volatile memory lookups required at the expense of requiring more volatile memory. The memory controller may use the volatile memory for other purposes.

When SSDs were first introduced, dynamic random-access memory (DRAM) was routinely included as a cache for SSDs and to improve drive performance. The DRAM served as cache for writing data to the SSD, and for storing the mapping tables that keep record of the location of the data on the SSD to allow access to the data. For years, it became the standard to continue to push the limits and gain better performance from SSDs using DRAM. However, there have been major improvements in the SSD interface, NAND technology, SSD controllers and firmware.

Coupled with the desire to increase both performance and capacity cost efficiently, a host system may make a portion of its host memory available for the use of the memory controller. For example, some versions of the NVMe protocol allow a Host Memory Buffer (HMB) feature, in which a portion of the host memory is allocated for the use of the memory controller. This option can save cost by allowing the memory controller to have less volatile memory. HMB, which was enabled through NVMe 1.2 specifications, allows SSDs to utilize some of the DRAM attached to the host, or central processing unit (CPU), through the PCIe connection instead of requiring DRAM to support an SSD. The greatest utilization of host DRAM is to cache mapping information, which often only requires tens of megabytes (MBs) of buffer size.

SUMMARY

One aspect of a storage device is disclosed herein. The storage device includes a memory and a controller. The memory includes a volatile memory. The controller is configured to determine that at least a portion in the volatile memory is a reusable region based on a host memory allocation from a host device. The controller is also configured to calculate a size of the reusable region in the volatile memory. The controller is also configured to perform one or more storage device operations in the reusable region of the volatile memory in response to the host memory allocation based on the calculated size of the reusable region.

Another aspect of a storage device is disclosed herein. The storage device includes a memory and a controller. The memory includes a volatile memory. The controller is configured to determine that at least a portion in the volatile memory is a reusable region based on a host memory allocation from a host device. The controller is also configured to calculate a size of the reusable region in the volatile memory. The controller is also configured to perform one or more storage device operations in the reusable region of the volatile memory in response to the host memory allocation based on the calculated size of the reusable region. The controller is also configured to release the host memory allocation back to the host device.

A further aspect of a storage device is disclosed herein. The storage device includes a memory and a controller. The memory includes a volatile memory. The controller is configured to determine whether the storage device supports HMB allocation. The controller is also configured to send, to a host device, a request for a HMB allocation for one or more internal modules associated with the controller, when the storage device is determined to support the HMB allocation. The controller is also configured to receive, from the host device, a response indicating whether the HMB allocation is successful. The controller is also configured to determine that at least a portion in the volatile memory is a reusable region based on a host memory allocation from a host device. The controller is also configured to calculate a size of the reusable region in the volatile memory. The controller is also configured to perform one or more storage device operations in the reusable region of the volatile memory in response to the host memory allocation based on the calculated size of the reusable region. The controller is also configured to release the host memory allocation back to the host device.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, with reference to the accompanying drawings, wherein:

FIG. 8 is a flow chart illustrating an exemplary process for memory handling during HMB allocation in the storage device of FIG. 1.

FIG. 9 is a flow chart illustrating an exemplary process for HMB allocation release in the storage device of FIG. 1.

DETAILED DESCRIPTION

Figure 1:
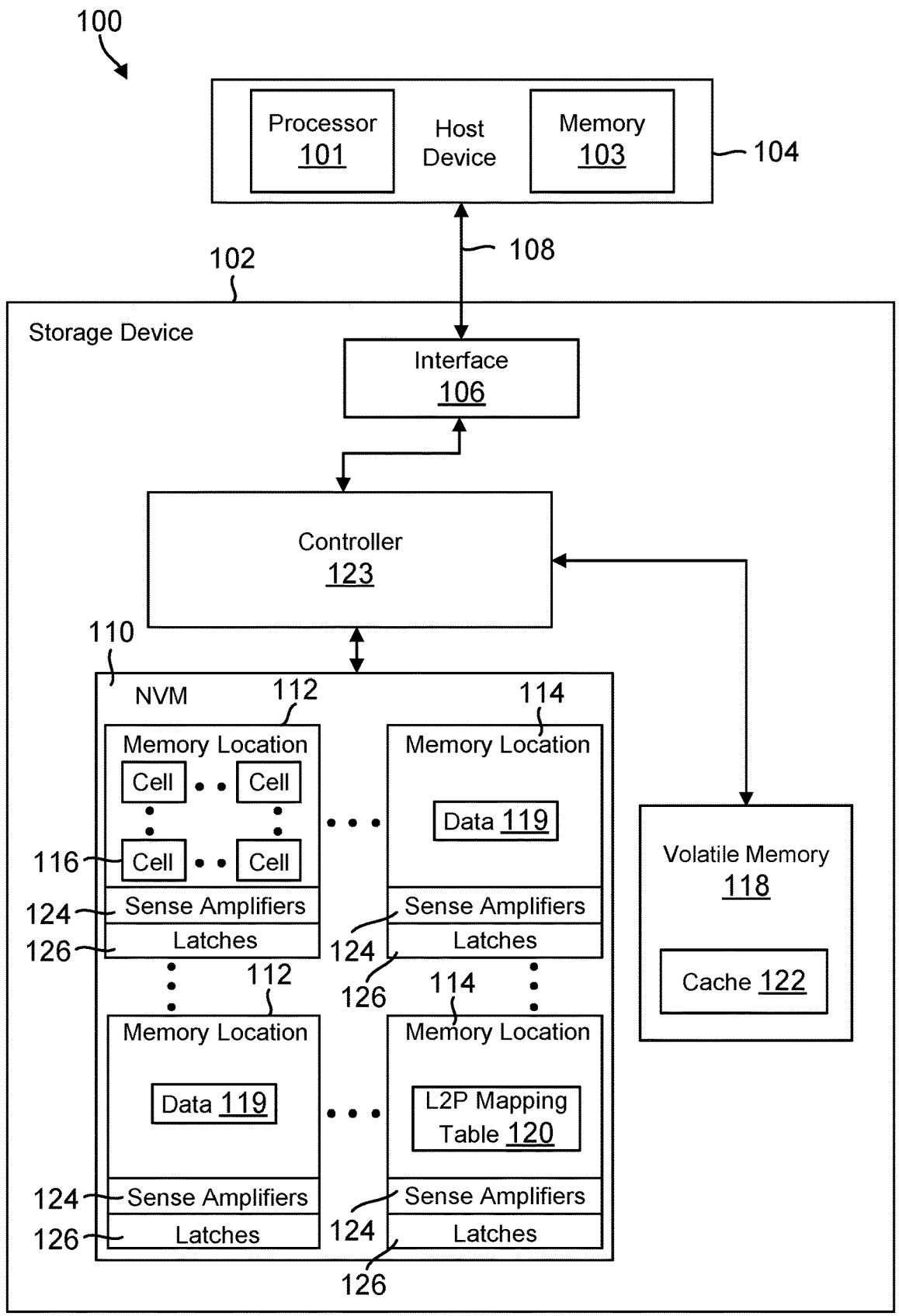
FIG. 1 is a block diagram illustrating an exemplary embodiment of a storage device in communication with a host device.

The detailed description set forth below in connection with the appended drawings is intended as a description of various exemplary embodiments of the present disclosure and is not intended to represent the only embodiments in which the present disclosure may be practiced. The detailed description includes specific details for the purpose of providing a thorough understanding of the present disclosure. However, it will be apparent to those skilled in the art that the present disclosure may be practiced without these specific details. In some instances, well-known structures and components are shown in block diagram form in order to avoid obscuring the concepts of the present disclosure. Acronyms and other descriptive terminology may be used merely for convenience and clarity and are not intended to limit the scope of the disclosure.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the disclosure include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs, Universal Serial Bus (USB) drives and SD memory cards. However, those skilled in the art will realize that these aspects may be extended to all types of storage devices capable of storing data. Accordingly, any reference to a specific apparatus or method is intended only to illustrate the various aspects of the present disclosure, with the understanding that such aspects may have a wide range of applications without departing from the spirit and scope of the present disclosure. For example, while the following description refers to SSDs, the description may similarly apply to other flash storage devices.

The HMB feature takes advantage of Direct Memory Access (DMA) capabilities of PCIe to allow SSDs to use some of the volatile memory (e.g., Static Random Access Memory (SRAM)/DRAM) attached to the CPU, instead of requiring the SSD to contain its own SRAM/DRAM. Accessing host memory over PCIe is slower than accessing onboard SRAM/DRAM, but relatively faster than reading from flash (e.g., NAND memory). The HMB is not intended to be a full-sized replacement for the onboard SRAM/DRAM that mainstream SSDs use. Rather, all SSDs using the HMB feature have targeted buffer sizes in the tens of MBs. This may be sufficient for the drive to cache mapping information for tens of gigabytes (GBs) of flash, which is adequate for many consumer workloads.

HMB is a highlighted feature of the NVMe protocol, which is the state-of-the-art storage interface for emerging storage devices such as SSDs. HMB enables the underlying storage to make use of a portion of host memory for caching address mapping information and/or user data, so that the limited capacity of memory within the storage device can be overcome. This technology opens an opportunity to optimize the I/O performance cost-effectively by sharing the ample host memory with a resource-constrained storage device.

Although SSD controllers contain a configured amount of memory, the amount of built-in memory may not be sufficient to allow a significant portion of NAND mapping tables to be cached internally. SSDs that omit volatile memory resources (e.g., SRAM/DRAM) can be less expensive in cost and smaller in size; however, because the storage device may be resource-constrained such that it can only store its mapping tables in flash memory (e.g., NAND) instead of a significantly faster volatile memory, there is a substantial performance penalty. SSDs can have limitations due to firmware overhead, complexity of storage operation algorithms and limited production costs due to volatile memory resources (e.g., RAM) or other hardware peripherals that facilitate in deciding read and write performance. The HMB feature provides an advantage in improving the SSD performance but not at full extent as HMB is limited from the host side.

The subject technology provides for an improvement in read performance of SSDs for successful HMB allocated scenarios. For example, for every successful HMB allocation, the host read performance can improve. The subject technology may not require any additional HMB allocation requests to facilitate the reuse of SSD volatile memory for SSD read performance improvements. The subject technology also allows for dynamic configuration for host read performance of random read operations, sequential read operations, or both.

The subject technology provides for the effective reuse of internal SRAM/DRAM during HMB allocation for loading additional sets of data (e.g., logical mapping of a chunk of logical block addresses (LBAs) for 32 MB of host data into 32 KB), inverse storage address tables (iSATs), relocation information (e.g., garbage collection), among others. An SSD controller can send a request to a host device for HMB allocation for any of its internal modules to handle efficiently for improving SSD read performance.

The SSD controller can send one request to a host device for the HMB allocation and, based on the priority of a respective internal module, the SSD controller may decide how to use the allocated HMB for its internal modules. In some aspects, the subject technology may be expanded to include further enhancements to address write operations (e.g., random, sequential, overlap) when a memory management unit (MMU) is implemented for SRAM/DRAM handling during HMB allocation of different internal SSD controller modules. This can help achieve an improvement in SSD write performance, where a set of data consolidation requirements due to write handling is required. The subject technology can be further expanded to address adaptive algorithms of loading sets of data based on host read and/or write patterns and successful allocations of HMB to reduce loading and evicting of sets of data from SRAM/DRAM.

FIG. 1 shows an exemplary block diagram 100 of a storage device 102 which communicates with a host device 104 (also "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a CPU), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magneto resistive random-access memory (MRAM) devices, ferroelectric random-access memory (F-RAM), and any other type of non-volatile memory devices. In other examples, the host memory 103 may include volatile memory, such as random-access memory (RAM), DRAM, static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host device 104 via a bus/network 108, and may interface using, for example, Ethernet or WiFi, or a bus standard such as Serial Advanced Technology Attachment (SATA), PCIe, Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra-Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host device 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a DRAM or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
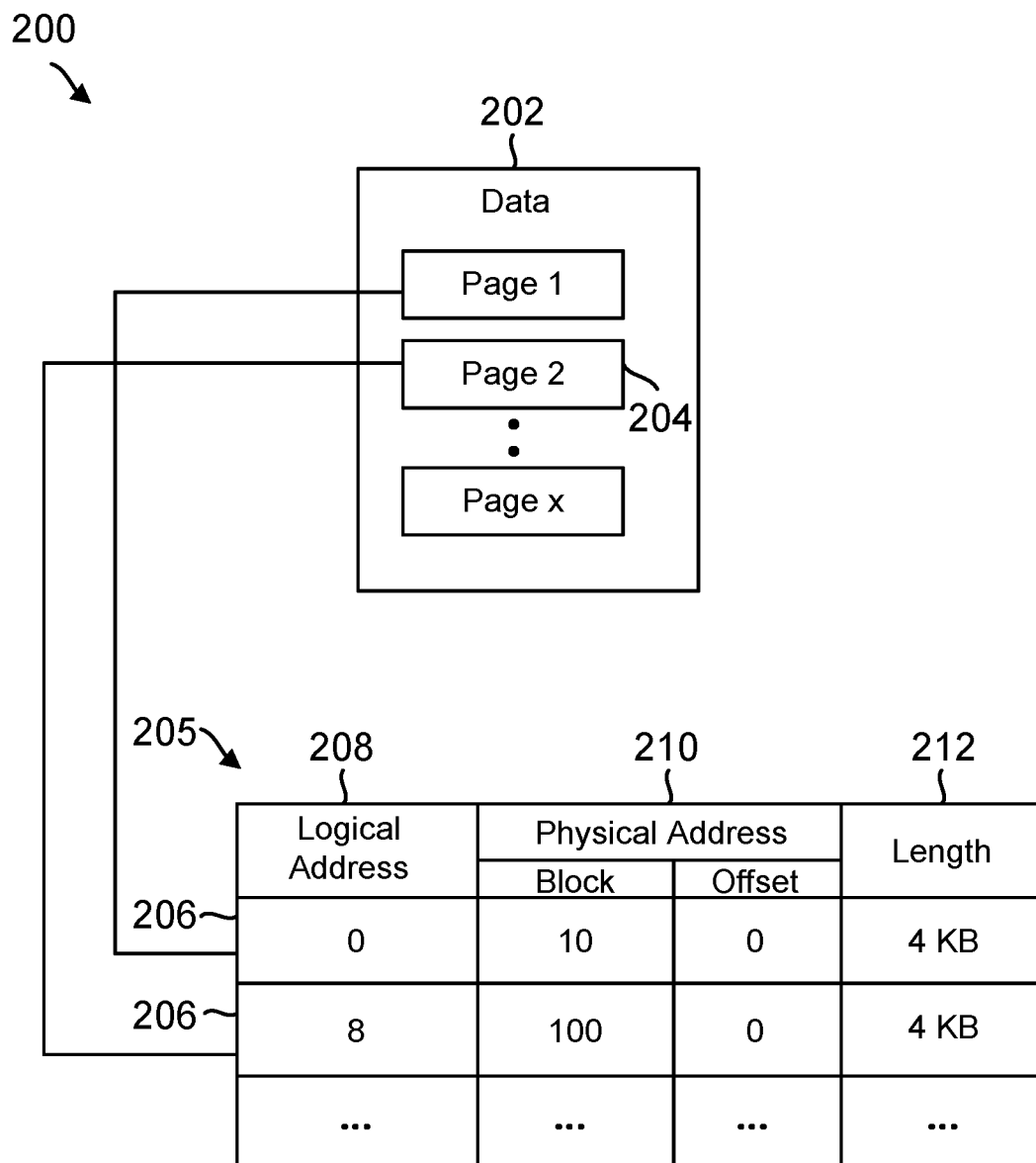
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a LBA 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The controller 123 controls transfer of the data from the data latches 126 to the volatile memory 118 via a data bus, which is stored in the volatile memory 118 until it is transferred to the host device 104. As there may not be additional memory with the controller 123, it can hold the data until the data is moved from the data latches 126 to the volatile memory 118. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an ASIC, a FPGA, hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The host interface 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host device 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host device 104 via the host interface 106.

Figure 3:
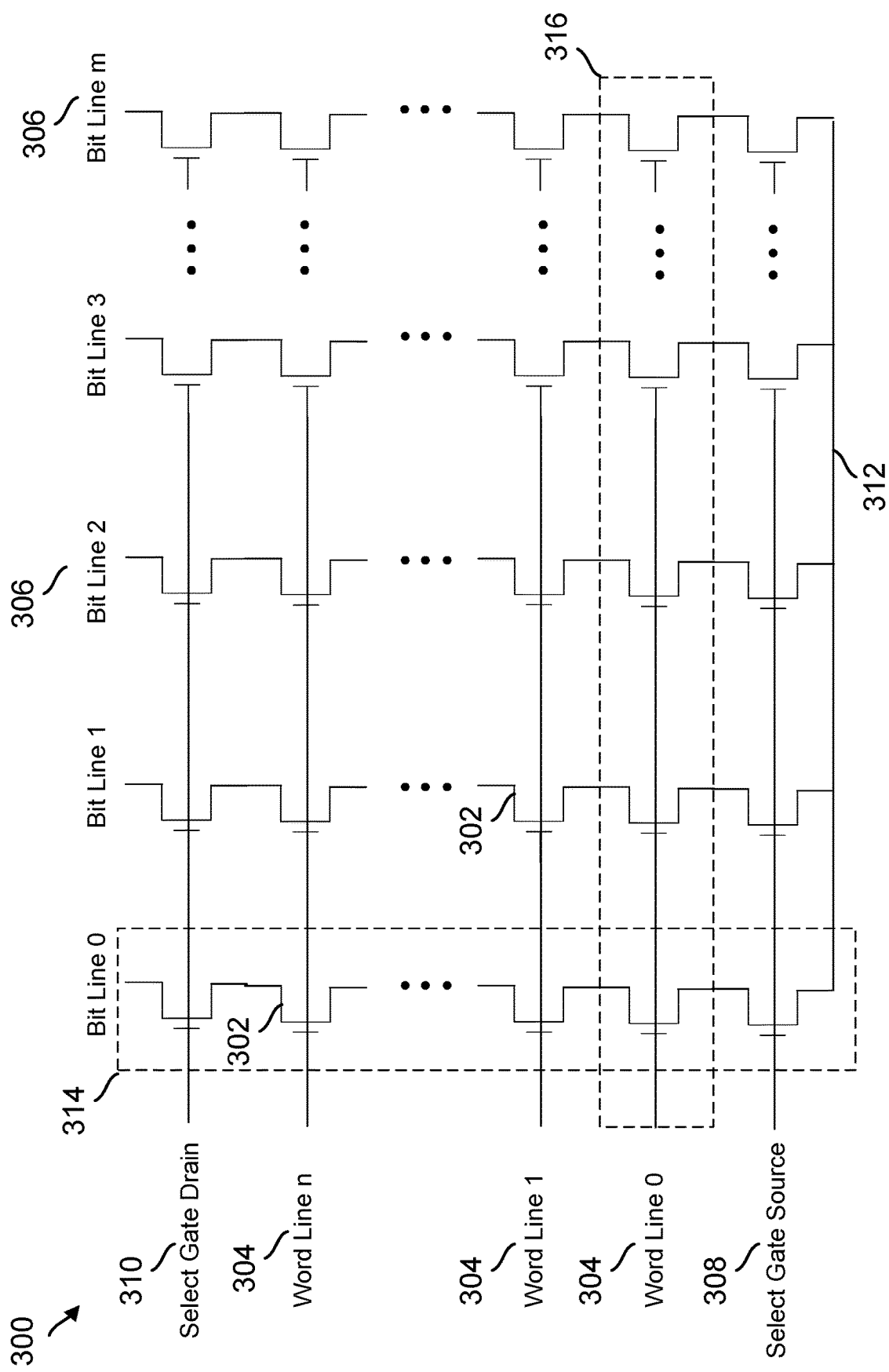
FIG. 3 is a conceptual diagram illustrating an example of a two-dimensional array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
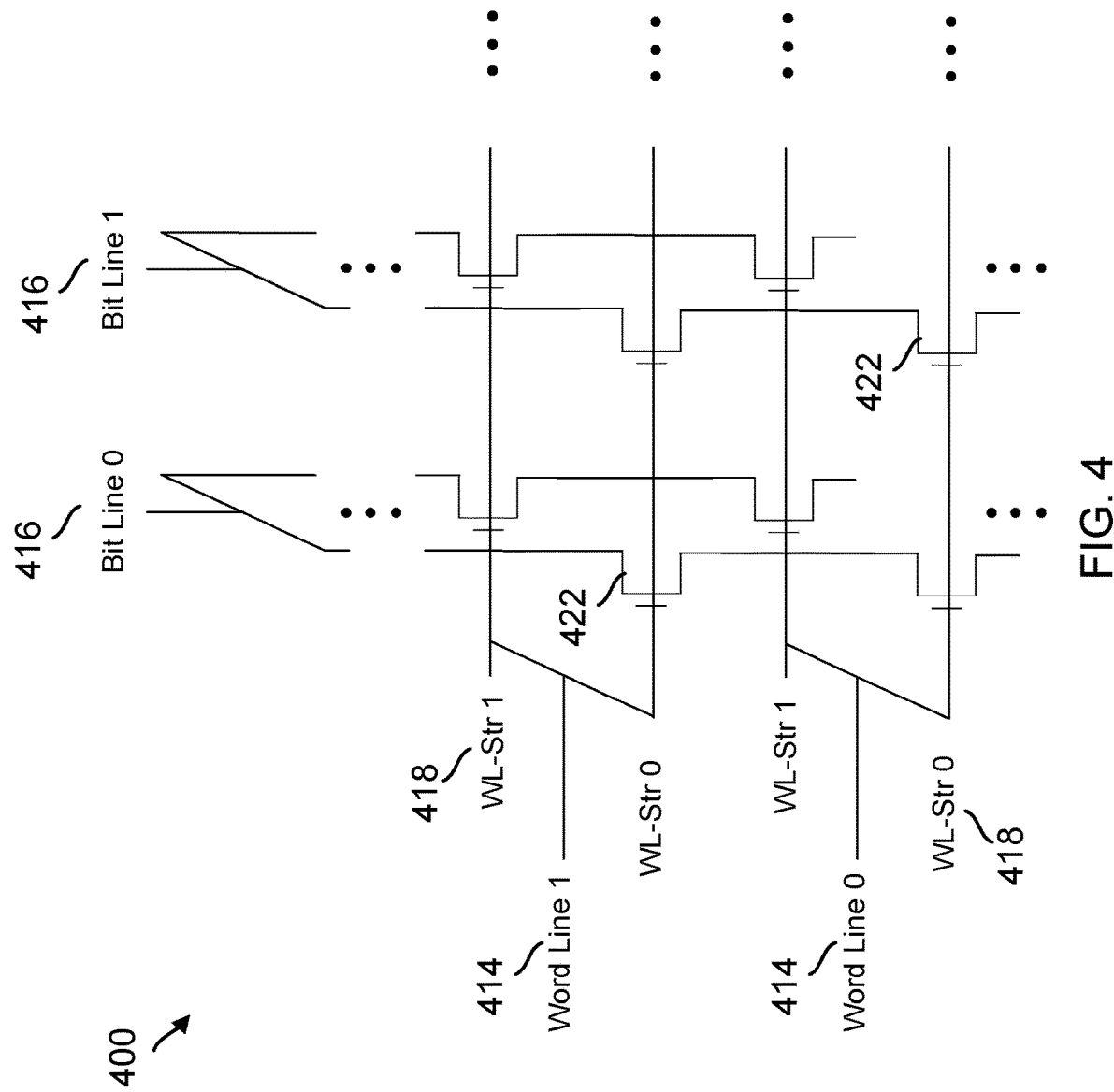
FIG. 4 is a conceptual diagram illustrating an example of a three dimensional array of memory cells in the storage device of FIG. 1.

FIG. 4 illustrates an example of a three-dimensional (3D) NAND memory array 400 of cells 422. Cells 422 may correspond to cells 116 in the NVM 110 of FIG. 1. As in the 2D memory array 300 of FIG. 3A, multiple cells 422 may be coupled to word lines 414 and bit lines 416. However, in the 3D memory array 400, the word lines 414 may each include multiple word line strings 418, and the bit lines 416 may be connected to each of the word line strings 418. Similarly, SGS cells and SGD cells (not shown) may respectively connect the memory cells in each word line string 418 to the source line (not shown) and bit lines 416. Thus, 3D memory array 400 may store more individually accessible pages of data on each word line 414 (e.g. in word line strings 418) than 2D memory array 300. While the 3D memory array 400 illustrated in FIG. 4 includes an example of two word line strings 418 for each word line 414, the word lines 414 may include other numbers of word line strings (e.g. four WL-Strs 0-3) in other examples. The architecture of FIG. 3B, or variations thereof, may be used in 3D NAND implementations including Bit Cost Scalable (BiCS) flash memory for ultra-high density storage devices.

Figure 5:
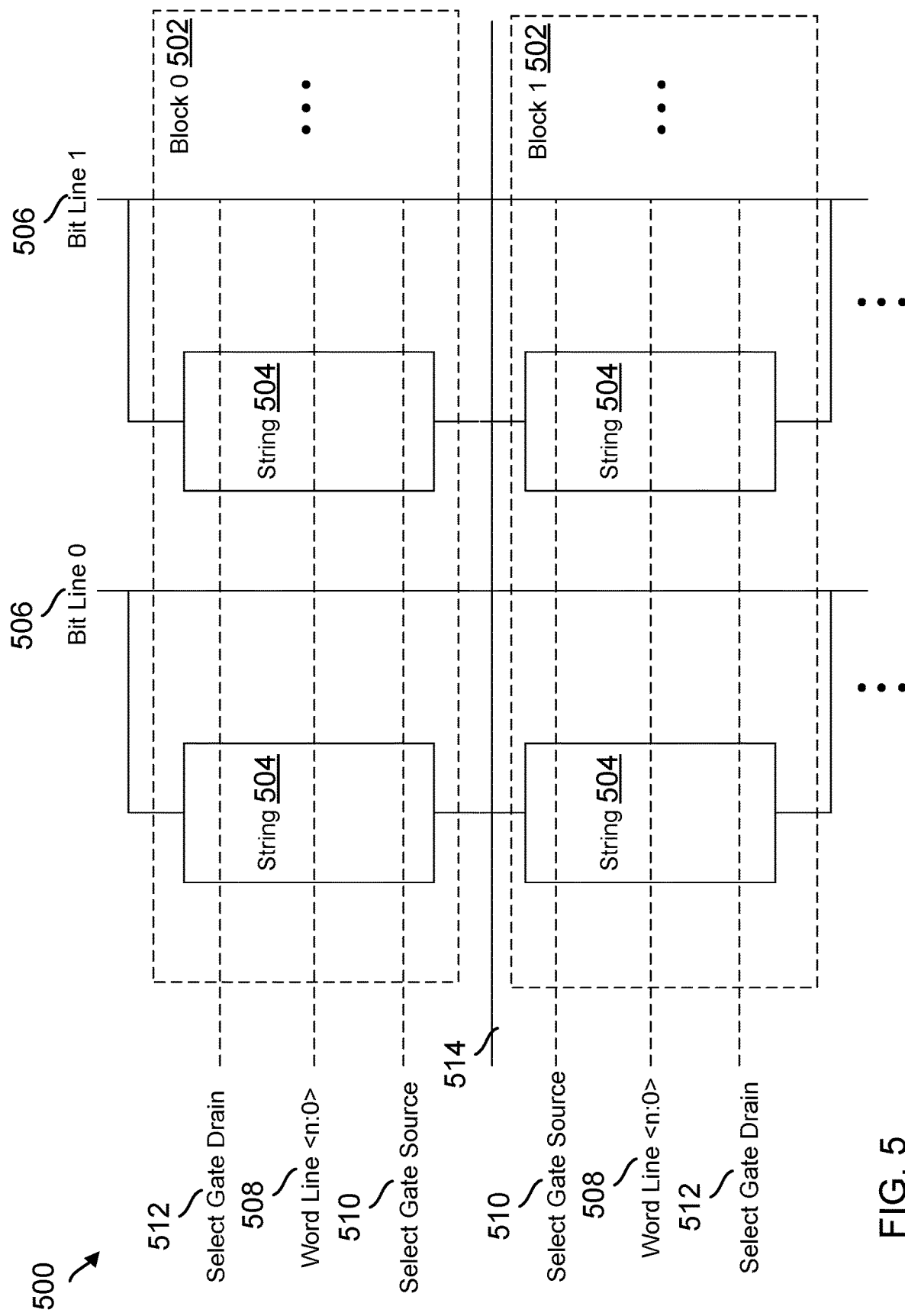
FIG. 5 is a conceptual diagram illustrating an example of an array of blocks in the storage device of FIG. 1.

FIG. 5 illustrates an example of a NAND memory array 500 of blocks 502 including multiple strings 504. Blocks 502 may correspond to blocks of a die 114 in the NVM 110 of FIG. 1, and strings 504 may each correspond to string 314 in FIG. 3. As in the memory array 300 of FIG. 3, each string 504 may include a group of memory cells each coupled to a bit line 506 and individually coupled to respective word lines 508. Similarly, each string may include a SGS cell 510 and SGD cell 512 which respectively connects the memory cells in each string 504 to a source line 514 and bit line 506.

When the controller 123 reads data from or writes data to a page 316 of cells 302 (i.e. on a word line 304, 508), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 508 until the cell reaches the threshold voltage, and during an erase operation, the controller may send a command to apply an erase voltage to the block 502 including the cells 302 (e.g. to a substrate of the cells such as a p-well) until the cells reduce back below the threshold voltage (back to logic '1').

For cells that store multiple bits (e.g. MLCs, TLCs, QLCs, etc.), each word line 304, 508 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 508 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 508 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 6:
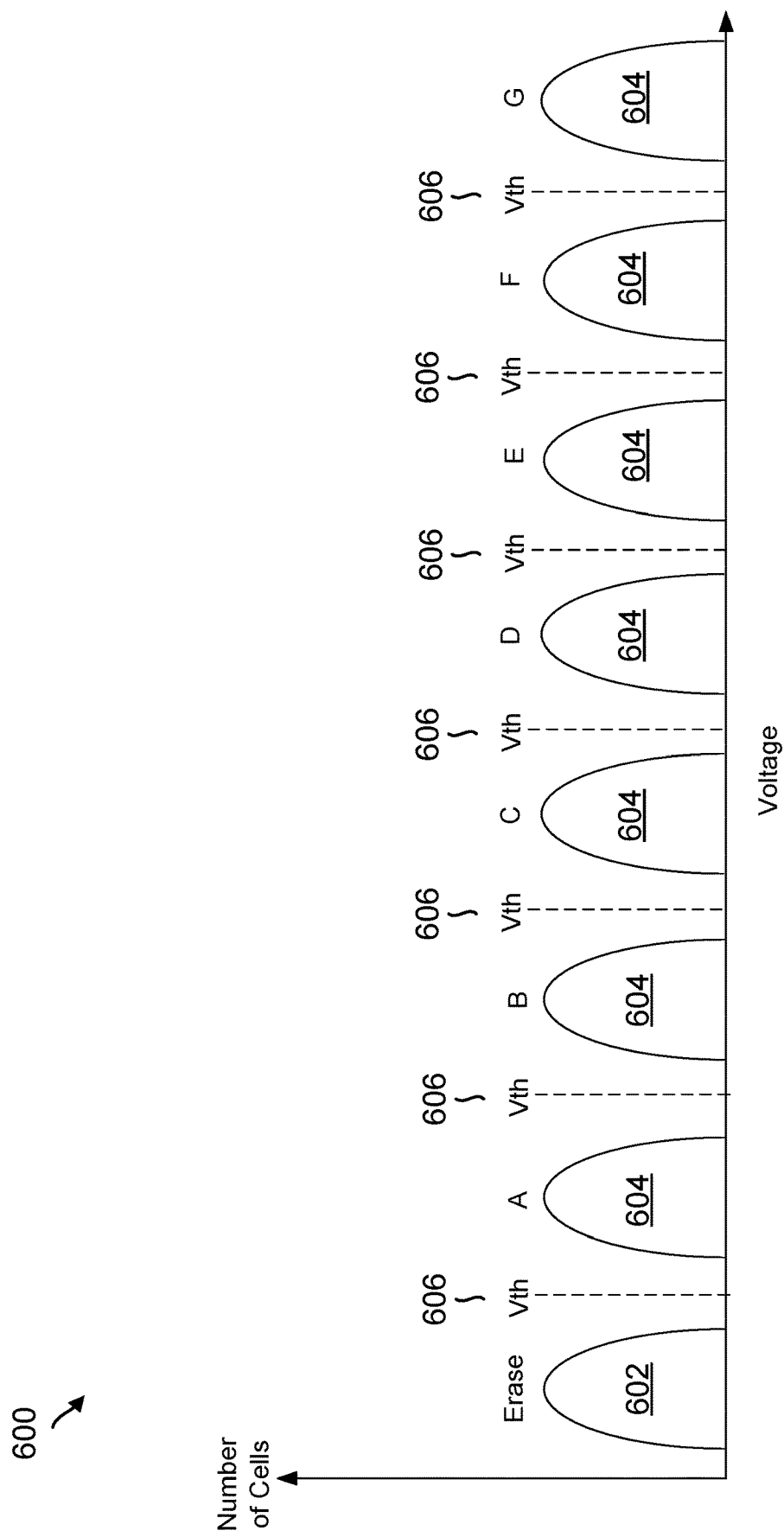
FIG. 6 is a graphical diagram illustrating an example of a voltage distribution chart for triple-level cells in the storage device of FIG. 1.

FIG. 6 illustrates an example of a voltage distribution chart 600 illustrating different NAND states for TLCs (e.g. cells 116, 302) storing three bits of data (e.g. logic 000, 001, etc. up to logic 111). The TLCs may include an erase state 602 corresponding to logic '111' and multiple program states 604 (e.g. A-G) corresponding to other logic values '000-110'. The program states 604 may be separated by different threshold voltages 606. Initially, the cells 116, 302 may be in the erase state 602, e.g. after the controller 123 erases a block 502 including the cells. When the controller 123 program LPs, MPs, and UPs as described above, the voltages of the cells 116, 302 may be increased until the threshold voltages 606 corresponding to the logic values to be stored are met, at which point the cells transition to their respective program states 604. While FIG. 6 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 508 into one of the program states 604, the controller may perform incremental step pulse programming (ISPP) over a number of programming loops or ISPP cycles. For example, a programming voltage (e.g. a high voltage) may be applied to the selected word line 304, 508, a pass through voltage (e.g. a high voltage lower than the programming voltage) may be applied to the other word lines 304, 508, a bit line program voltage (e.g. a low voltage) may be applied on the bit lines 306, 506 connected to the selected cells being programmed on the selected word line, and a bit line inhibit voltage (e.g. a high voltage) may be applied on the bit lines 306, 506 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 508 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

Figure 7:
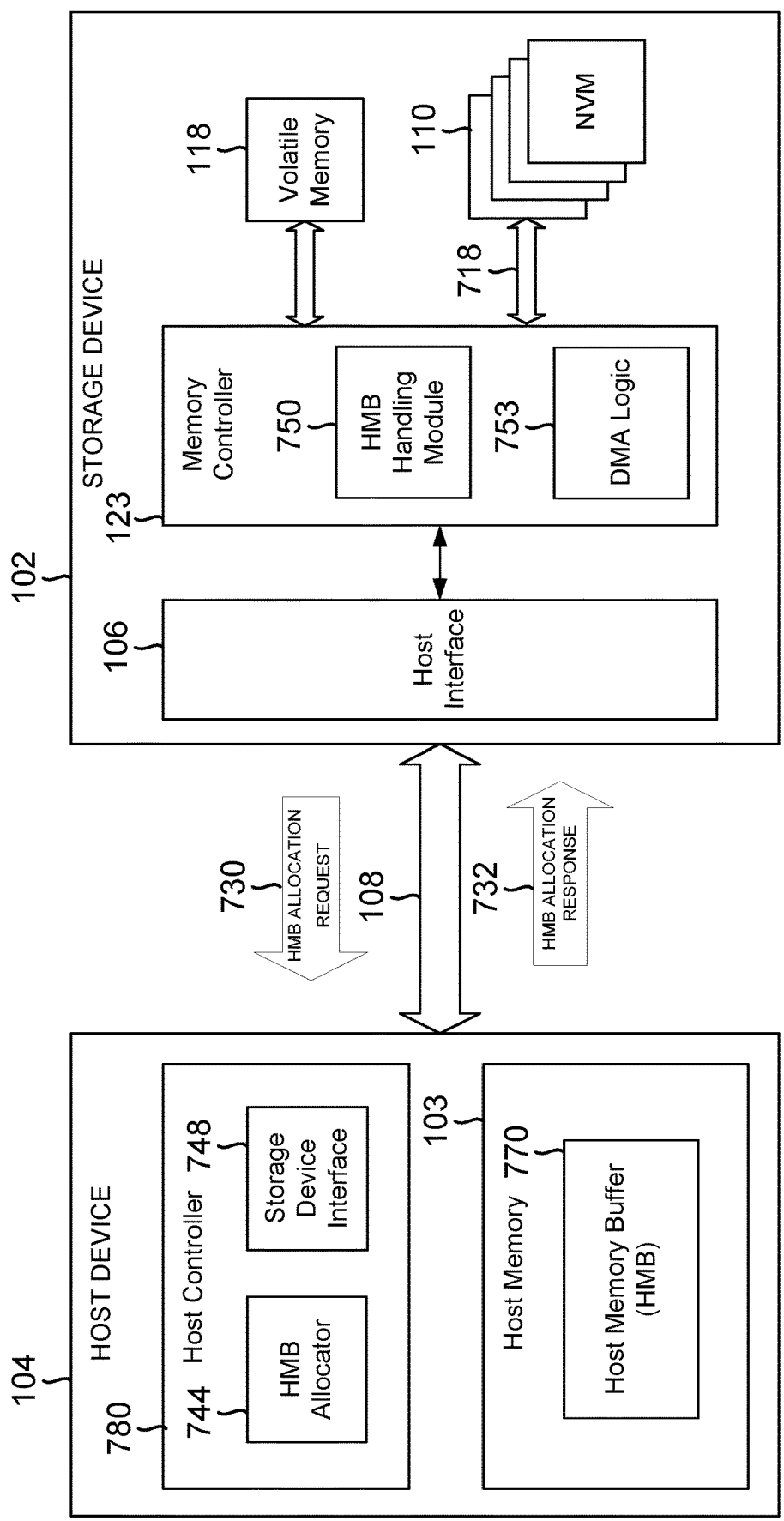
FIG. 7 is a conceptual diagram illustrating an example of a non-volatile memory system in the storage device of FIG. 1 which communicates with a host device.

FIG. 7 is a block diagram of example non-volatile memory system in the storage device of FIG. 1, depicting more details of one exemplary embodiment of a memory controller 123 and a host device 104. In one exemplary embodiment, the system of FIG. 7 is a SSD. As used herein, the memory controller 123 is a device that manages data stored on a non-volatile memory device and communicates with the host device 104, such as a computer or electronic device. In some exemplary embodiments, the non-volatile memory 110 contains flash (e.g., NAND, NOR) memory cells, in which case the memory controller 123 may be a flash memory controller.

The memory controller 123 can have various functionality in addition to the specific functionality described herein. For example, the memory controller can format the memory to ensure the memory is operating properly, map out bad memory cells, and allocate spare memory cells to be substituted for future failed cells. Some part of the spare cells can be used to hold firmware to operate the memory controller and implement other features. In operation, when the host device 104 needs to read data from or write data to the memory, it can communicate with the memory controller 123. If the host device 104 provides a logical address (LA) to which data is to be read/written, the memory controller 123 can convert the logical address received from the host device 104 to a physical address in the memory. The logical address may be a LBA, and the physical address may be a physical block address (PBA). (Alternatively, the host device 104 can provide the physical address). The memory controller 123 can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The memory controller 123 may be configured to implement a memory access protocol, such as an NVMe protocol. In some exemplary embodiments, the memory controller 123 is configured to implement an extension to an NVMe protocol that allows the memory controller 123 to request a dynamic change to the size of a HMB 770. A memory controller 123 that implements an NVMe protocol or an extension to an NVMe protocol that allows the memory controller 123 to request a dynamic change to the size of the HMB 770 is referred to herein as an NVMe memory controller. Likewise, a host controller 780 that implements a Peripheral Component Interconnect (PCI) protocol or an extension to an NVMe protocol that grants the memory controller 123 request of a dynamic change to the size of the HMB 770 is referred to herein as an NVMe host controller.

A portion of the host memory 103 may be used for a HMB 770. The HMB 770 may be a buffer that is allocated by the host device 104 for use of the memory controller 123. In some exemplary embodiments, the HMB 770 is for exclusive usage of the memory controller 123. For example, the memory controller 123 may use the HMB 770 to cache data. The host device 104 may guarantee that the data in the HMB 770 can be valid and is obliged to notify the memory controller 123 before any operation that may cause data loss (e.g., power loss, host may need this buffer, etc., . . . ), in one exemplary embodiment. The host device 104 allows the memory controller 123 to acknowledge this operation before the data is lost, in one exemplary embodiment. In one exemplary embodiment, the host device 104 can perform an initial allocation of the HMB 770 to the memory controller 123 when the memory controller 123 is initialized. The memory controller 123 is initialized when the storage device 102 is powered on, in one exemplary embodiment. The initial allocation may be compliant with NVMe; however, the initial allocation of HMB is not limited to NVMe.

The HMB 770 may be logically divided into units such as data buffers. For example, each data buffer may be 4 KB, or some other size. The host memory 103 may be used to store HMB pointers. The HMB pointers may contain physical addresses in the host memory 103 of the buffers. The HMB pointers also may contain a size parameter, which indicates the size of a buffer.

Note that a portion of host memory 103 may be used for data buffers in which the host device 104 may store host data to be written to the NVM 110, or to store host data that was read from the NVM 110.

The host device 104 has a host controller 780. The host controller 780, as the term is used herein, is a device that communicates with the memory controller 123 in order to access non-volatile memory, which is under the control of the memory controller 123. Host controller 780 may be configured to implement host controller functions of a memory access protocol, including but not limited to NVMe. Note that host controller 780 may be configured to implement techniques which may be extensions to a memory access protocol such as NVMe.

The host controller 780 has an HMB allocator 744, which may be configured to allocate the HMB to the memory controller 123 and maintain the HMB allocation with the storage device until certain power state events. In one exemplary embodiment, the HMB allocator 744 is configured to make an allocation of HMB 770 based on a request from the memory controller 123 during a power on state of the storage device, and the host controller 780 maintains the HMB allocation with the storage device until the storage device is powered off (graceful or ungraceful). In this regard, the HMB allocation can be released completely during a power off state of the storage device. In some aspects, the host controller 780 can maintain the HMB allocation with the storage device even if the storage device transitions into a low power state (e.g., power state 3, power state 4).

The host controller 780 may communicate with the memory controller 123 over interface 106 (in FIG. 1). The storage device interface 748 may include a physical layer interface (PHY) that provides an electrical interface with the storage device 102 and/or interface 106. In one exemplary embodiment, PHY includes hardware that is compliant with PCIe. However, PHY is not limited to PCIe. The storage device interface 748 typically facilitates transfer for data, control signals, and timing signals over interface 106.

The HMB allocator 744 and storage device interface 748 may take the form of a packaged functional hardware unit (e.g., an electrical circuit) designed for use with other components, a portion of a program code (e.g., software or firmware) executable by a processing circuitry (or one or more processors) that usually performs a particular function of related functions, or a self-contained hardware or software component that interfaces with a larger system, for example. For example, the HMB allocator 744 may include an ASIC, a FPGA, a circuit, a digital logic circuit, an analog circuit, a combination of discrete circuits, gates, or any other type of hardware or combination thereof. Alternatively or in addition, each module may include or comprise software stored in a processor readable device (e.g., host memory 103) to program one or more processors to perform the functions described herein.

The memory controller 123 may interface with the NVM 110. In one exemplary embodiment, the memory controller 123 and multiple memory dies (together comprising the storage device 102) implement a SSD, which can emulate, replace or be used instead of a hard disk drive inside a host, as a NAS device, etc. Additionally, the SSD need not be made to work as a hard drive.

In some exemplary embodiments, the storage device 102 includes a single channel between the memory controller 123 and non-volatile memory 110, although the subject matter described herein is not limited to having a single memory channel. For example, in some non-volatile memory device architectures, 4, 7, 8 or more channels may exist between the memory controller 123 and the memory dies, depending on memory controller capabilities. In any of the exemplary embodiments described herein, more than a single channel may exist between the memory controller and the memory dies, even if a single channel is shown in the drawings.

The memory controller 123 includes a host interface 106 that provides the electrical interface with the host device 104 or a next level storage memory controller. The host interface 106 may include a PHY. In one exemplary embodiment, host interface 106 includes hardware that is compliant with PCIe. However, host interface 106 is not limited to PCIe. The host interface 106 typically facilitates transfer for data, control signals, and timing signals. The host interface may be configured to configured to provide communication with the host device 104.

The memory controller 123 has a HMB handling module 750. In some aspects, the HMB handling module 750 may be referred to as a MMU. The HMB handling module 750 is configured to make requests for an allocation of HMB 770. The HMB handling module 750 may be configured to request an initial allocation of HMB during memory controller initialization. The HMB handling module 750 is configured to make a request for additional HMB 770 during runtime (e.g., after the memory controller is initialized), in one exemplary embodiment. The HMB allocation is released following a graceful or ungraceful shutdown of the storage device, after which the HMB handling module 750 can make another request for HBM allocation when the storage device is powered on again, in one exemplary embodiment. The HMB handling module 750 may be configured to release the additional HMB 770 after the memory controller 123 is done using the additional HMB 770, in another exemplary embodiment.

The host memory 103 may store HMB pointers, which are data buffer pointers to the HMB 770. For example, each HMB pointer may point to one unit of memory. Each unit of memory may be a page, wherein the page size is set by the host device 104. In one exemplary embodiment, the HMB pointers may be Host Memory Buffer Descriptors, in accordance with the NVMe protocol. However, the HMB pointers are not limited to the NVMe protocol. The HMB pointers may be provided by the HMB allocator 744 in the host device 104.

In some aspects, the HMB handling module 750 may request for an HMB allocation with a minimum and/or maximum range. If the HMB handling module 750 determines that that granted HMB allocation corresponds to lesser than a requested minimum allocation (e.g., a partial HMB allocation), then the HMB handling module 750 may not accept the HMB allocation and subsequently initiate a new request. On the other hand, if the HMB handling module 750 accepts the granted HMB allocation, then the HMB handling module 750 may not initiate a new request to modify a requested HMB allocation size. In other aspects, the host memory 103 may be used to store log pages, which may be used to store various information to report to the host device 104. In one exemplary embodiment, a log page is used to store information to request a change in the amount of HMB 770. For example, a log page may contain a request for additional HMB, or to release a portion of the HMB 770 back to the host device 104.

The HMB 770 may be used to store management tables. In one exemplary embodiment, the management tables include L2P tables (logical to physical mappings) and P2L tables (physical to logical mappings). The memory controller 123 can use the management tables to map logical addresses (LAs) to physical addresses (PAs). Such management tables can be used to directly map LAs to the PAs, or LAs can be mapped to intermediate or virtual addresses, which are mapped to PAs. In some exemplary embodiments, the logical addresses are logical block addresses, and the physical addresses are physical block addresses. Other variations are also possible.

The management tables may also be used to manage caching of data in locations other than in the non-volatile memory 110. In one exemplary embodiment, the memory controller 123 caches data in the HMB 770. For example, the memory controller 123 may use the HMB 770 to cache data that is associated with some LAs (or range of LAs). The management tables may also be used to manage caching of data in the HMB 770. In one exemplary embodiment, the memory controller 123 caches data in the volatile memory 118. For example, the memory controller 123 may use the volatile memory 118 to cache data that is associated with some LAs (or range of LAs). The management tables may also be used to manage caching of data in the volatile memory 118. The volatile memory 118 is volatile memory (such as volatile memory 118 of FIG. 1), in one exemplary embodiment.

DMA logic 753 is configured to control DMA transfer of data between the non-volatile memory 110 and the host memory 103 in the host device 104. DMA logic 753 can make a direct memory access to the HMB 770. For example, DMA logic 753 may cache data into the HMB 770. For example, DMA logic 753 may access data from HMB 770 and transfer it to the volatile memory 118 (e.g., cache 122 of FIG. 1). DMA logic 753 may use HMB pointers to access the correct location in HMB 770.

The memory controller 123 may include a memory interface that provides the command sequences to non-volatile memory 110 and receives status information from non-volatile memory 110. The memory interface may be configured to access non-volatile memory on the non-volatile memory 110. The memory interface may provide an electrical connection to lines 718. The memory interface may control timing of signals over lines 718 to non-volatile memory 110. In one exemplary embodiment, the memory interface may be a double data rate (DDR) interface. In some exemplary embodiments, the memory interface is a flash memory interface. However, the memory cells in non-volatile memory 110 are not limited to flash memory. Hence, the memory interface is not limited to a flash memory interface.

The components of memory controller 123 depicted in FIG. 7 may take the form of a packaged functional hardware unit (e.g., an electrical circuit) designed for use with other components, a portion of a program code (e.g., software or firmware) executable by a (micro)processor or processing circuitry (or one or more processors) that usually performs a particular function of related functions, or a self-contained hardware or software component that interfaces with a larger system, for example. For example, all or a portion of each module (including, but not limited to, HMB handling module 750, DMA logic 753, host interface 106) may include an ASIC, a FPGA, a circuit, a digital logic circuit, an analog circuit, a combination of discrete circuits, gates, or any other type of hardware or combination thereof. Alternatively or in addition, all or a portion of each module may include or comprise software stored in a processor readable device (e.g., memory) to program a one or more processors for memory controller 123 to perform the functions described herein. The architecture depicted in FIG. 7 is one exemplary embodiment that may (or may not) use the components of the memory controller 123 (e.g., cache 122).

As described in FIG. 7, the memory controller 123 uses memory to cache mapping information for data stored in NVM 110. However, the size of memory in the memory controller 123 is usually not enough to allow a significant portion of NAND mapping tables to be cached. As a result, the storage device 102 (e.g., the memory controller 123) uses the HMB feature to cache mapping information for tens of gigabytes of flash, which is adequate for many consumer workloads.

In an exemplary embodiment, the memory controller 123 sends a request (e.g., HMB allocation request 730) to the host device 104 for HMB allocation. The HMB allocation may be requested for serving any internal modules of the memory controller 123 (not shown), such as a storage address table (SAT), inverse SAT (iSAT), exclusive OR (XOR) parity data, controller address table (CAT), relocation (RLC), among others. In some aspects, the HMB allocation request 730 may include a request from one internal module, such that multiple HMB allocation requests may be sent to the host device 104 on behalf of multiple internal modules of the memory controller 123 where each request pertains to one of the internal modules. In other aspects, the HMB allocation request 730 may include an aggregate request from multiple internal modules, where the HMB allocation request 730 specifies the requested size of HMB 770 for each of the internal modules. If the host device 104 grants a full requested HMB allocation, a region in the volatile memory 118 (e.g., static random-access memory (SRAM)) of the storage device 102 for the requested module (e.g., SAT, iSAT, XOR, CAT, RLC, etc.) may not be used.

The present disclosure provides for a process of managing HMB allocation for improving SSD read performance. As per the subject technology, on successful allocation of the HMB 770, the allocated HMB size for the respective module is determined by the memory controller 123. The volatile memory 118 (e.g., SRAM/DRAM) allocation for the corresponding module is fetched and it is determined whether the SRAM/DRAM region is reusable. If it is determined that the volatile memory 118 region is reusable, the memory controller 123 calculates the size of the reusable volatile memory 118 region and loads preferred sets of data (e.g., logical mapping of a chunk of LBAs for 32 MB of host data into 32 KB) in the reusable volatile memory 118 region for improving sequential read performance or random read performance. The loading of sets of data may be decided by the memory controller 123 based on a current pattern of host reads and the loading may be customized for an application to obtain the best read performance. If the allocated HMB region is to be released, the memory controller 123 may determine which modules are using the allocated region in the HMB 770 and whether the corresponding allocated volatile memory 118 region is being reused. If the memory controller 123 determines a release of the reused volatile memory 118 region, the memory controller 123 may evict all sets of data from the volatile memory 118 region and releases the allocated HMB 770 region back to the host device 104. The algorithm of loading sets of data is further adapted based on host read/write patterns to reduce loading and evicting of sets of data from the volatile memory 118 region.

If multiple modules of the memory controller 123 used a granted allocation of the HMB 770 for their internal operations (as a single request and the HMB allocation is granted for the storage device), then the HMB handling module 750 may combine all chunks of freed volatile memory 118 regions into one logical chunk and uses this effectively for improving host reads.

FIG. 8 is a flow chart illustrating an exemplary process 800 for memory handling during HMB allocation in the storage device 102 of FIG. 1. In FIG. 8, a memory controller 123 may act based on whether or not its request for HMB allocation is granted by the host controller 780. In some aspects, the process 800 may be performed during initialization phase of the memory controller 123. In other aspects, the process 800 may be performed during a runtime phase.

Some of the blocks may be performed by the host device 104 (e.g., by the host controller 780), with others performed by the storage device 102 (e.g., by memory controller 123). The initialization phase refers to initializing the memory controller 123. In one embodiment, the initialization phase is performed in accordance with an NVMe protocol. However, the initialization phase is not limited to NVMe. The initialization phase may be performed after a power on reset of the storage device 102. The initialization phase may be used to establish values in registers such as PCIe registers.

At 802, a determination is made as to whether the storage device 102 supports HMB allocation. In some aspects, the block 802 may be performed by the host device 104 (e.g., by the host controller 780). In other aspects, the block 802 may be performed by the storage device 102 (e.g., by memory controller 123). If the storage device 102 supports HMB allocation, then the process 800 proceeds to block 804. Otherwise, the process 800 is terminated.

At 804, the memory controller 123 requests the host controller 780 for an amount of host memory 103 for the use of the memory controller 123 (e.g., HMB allocation request 730). In one embodiment, the memory controller 123 makes a request in compliance with a version of the NVMe protocol. In one embodiment, the memory controller 123 requests allocation of the HMB 770 in accordance with a version of the NVMe protocol. The memory controller 123 may indicate a requested size of the host memory 103 to allocate for use of the memory controller 123. In some aspects, the memory controller 123 may specify a requested preferred size of the HMB 770. In some aspects, the memory controller 123 may specify a minimum size of the HMB 770 that is required by the memory controller 123.

Block 804 includes the host controller 780 allocating a region of the host memory 103 for the use of the memory controller 123. Block 804 may be performed by the host controller 780 in response to the request from the memory controller 123 in block 804. In one embodiment, the host controller 780 may generate a descriptor list that has pointers to the region of the host memory 103. In some aspects, the descriptor list may include pointers to one or more regions of the HMB 770.

At 806, the memory controller 123 may determine whether the requested HMB allocation was successful. If the HMB allocation was successful, the process 800 proceeds to block 808. Otherwise, the process 800 can be terminated. Block 806 includes the host controller 780 reporting whether the allocation of the host memory 103 to the memory controller 123 was successful. In some aspects, the host controller 780 sends an HMB allocation response (e.g., HMB allocation response 732 in FIG. 7), which indicates whether the HMB allocation was successful. In one embodiment, the host controller 780 sends a command to the memory controller 123 to report the allocation. For example, the host controller 780 may indicate which internal module of the memory controller 123 was allocated with at least a portion of the HMB 770. In another example, the host controller 780 may indicate a total HMB allocation that corresponds to a total allocated size of the HMB 770 for use of the memory controller 123.

Block 806 may include a decision based on whether the host controller 780 grants the HMB allocation request 730. There may be three outcomes based on the degree to which the host controller 780 grants the request. The host device 104 may fully grant the HMB allocation request 730, which means that the host controller 780 provides the entire requested allocation amount of HMB 770. In this regard, a full grant of the HMB allocation request 730 represents a successful HMB allocation. The host controller 780 may deny the HMB allocation request 730, which means that the host controller 780 will not grant the requested allocation of HMB 770. In this regard, a denial of the HMB allocation request 730 represents an unsuccessful HMB allocation. The host controller 780 may partially grant the HMB allocation request 730, which means that the host controller 780 may grant allocation of a portion of the requested amount of the HMB 770. In this regard, a partial grant of the HMB allocation request 730 represents a successful HMB allocation. If the host device 104 fully grants the HMB allocation request 730, the memory controller 123 uses the allocated HMB 770 to perform a task. For example, the memory controller 123 uses the allocated HMB 770 to perform a storage device operation (e.g., garbage collection).

At block 808, the memory controller 123 allocates a region of volatile memory according to the allocated HMB from the total HMB allocation for a respective module of the memory controller 123 based on a corresponding priority of the respective module. In this regard, the memory controller 123 may decide how to utilize the allocated HMB of the respective module by allocating a volatile memory region to determine whether SSD read performance during HMB allocation can be improved. In contrast, traditional approaches required an SRAM region in a storage device that was allocated to a requesting module to not be utilized effectively in response to a fully requested HMB allocation. In some aspects, each internal module of the memory controller 123 may have a different priority. In some aspects, the priority may be based on a type of the internal module. In some aspects, the priority may be based on a number of workloads being processed with the internal module, such that the priority increases as the number of workloads increases.

At block 810, the memory controller 123 fetches the allocated region of the volatile memory 118 for the respective module. For example, the memory controller 123 may fetch an allocated region of the cache 122 (e.g., SRAM, DRAM). The region in the volatile memory 118 may be allocated to a specific internal module of the memory controller 123. Further details of the volatile memory 118 allocation for the respective modules will be discussed with reference to FIG. 9A.

At 812, the memory controller 123 determines whether the fetched allocated region of the volatile memory 118 is reusable. If the fetched allocated region of the volatile memory 118 is reusable, then the process 800 proceeds to block 814. Otherwise, the process 800 can be terminated at this point.

In some aspects, if the host controller 780 fully grants the requested HMB allocation, the amount of volatile memory that is freed may correspond substantially to the full amount of volatile memory used by the internal module. For example, if an internal module is using 500 KB of volatile memory and the HMB allocation indicates that 500 KB of host memory is allocated to the internal module, then the memory controller 123 can determine that 500 KB can be freed by the HMB allocation. The memory controller 123 may determine that 500 KB is sufficient to perform one or more read operations that would improve the SSD read performance for the internal module, and decide that the fetched allocated region of the volatile memory 118 is reusable. In another aspect, if the host controller 780 grants a partial amount of the requested HMB allocation, the amount of volatile memory that is freed may correspond to a portion of the full amount of volatile memory used by the internal module. For example, if an internal module is using 50 KB of volatile memory and the HMB allocation indicates that 4 KB of host memory is allocated to the internal module, then the memory controller 123 can determine that 4 KB can be freed by the HMB allocation. The memory controller 123 may determine that 4 KB is not sufficient to perform one or more read operations that would improve the SSD read performance for the internal module, and decide that the fetched allocated region of the volatile memory 118 is not reusable. In another example, if an internal module is using 100 KB of volatile memory and the HMB allocation indicates that 90 KB of host memory is allocated to the internal module, then the memory controller 123 can determine that 90 KB can be freed by the HMB allocation. The memory controller 123 may determine that 90 KB is sufficient to perform one or more read operations that would improve the SSD read performance for the internal module, and decide that the fetched allocated region of the volatile memory 118 is reusable. In some aspects, the degree by which a freed up region in the volatile memory 118 is reusable may be based on a configurable threshold. For example, the memory controller 123 may determine that the freed region of volatile memory is reusable when the freed region exceeds the configurable threshold. In some aspects, the configurable threshold may represent a required amount of memory to facilitate performance of a storage device operation associated with a memory controller module.

At 814, the memory controller 123 calculates the size of the reusable volatile memory 118 region when the fetched allocated region in the volatile memory 118 is reusable. The calculation may be a more granular calculation than a cursory calculation used at block 812. The reusable region calculation can be used to determine whether subsequent loading of mapping tables and/or buffer allocations for the host device 104 can be performed.

At 816, depending on the reusable region calculation, the memory controller 123 can load an iSAT table and/or relocation information. The amount of volatile memory used to load the iSAT/RLC can correspond up to the amount calculated at block 814.

At 818, depending on the reusable region calculation, the memory controller 123 can load sets of data for improvement in random read performance. The amount of volatile memory used to load the sets of data for random performance can correspond up to the amount calculated at block 814.

At 820, depending on the reusable region calculation, the memory controller 123 can load sets of data for improvement in sequential read performance. The amount of volatile memory used to load the sets of data for sequential performance can correspond up to the amount calculated at block 814.

At 822, depending on the reusable region calculation, the memory controller 123 can load sets of data for improvement in random and sequential read performance. The amount of volatile memory used to load the sets of data for random and sequential performance can correspond up to the amount calculated at block 814.

At 824, depending on the reusable region calculation, the memory controller 123 can allocate the reusable region for host read and/or write buffering. The amount of volatile memory used to allocate for host read/write buffering can correspond up to the amount calculated at block 814.

FIG. 9 is a flow chart illustrating an exemplary process 900 for HMB allocation release in the storage device 102 of FIG. 1. The memory controller 123 may utilize reusable volatile memory for improvements in SSD read/write performance and decide to release the allocated HMB back to the host device 104.

At 902, the memory controller 123 decides to release the allocated HMB to the host device 104. In some aspects, the memory controller 123 may determine that a respective internal module is done using the reused region in the volatile memory 118 and decides to issue a command to the host device 104 that indicates that the memory controller 123 intends to release the corresponding allocated HMB.

At 904, the memory controller 123 may identify which modules are using the HMB allocation. The memory controller 123 may determine which modules are using the HMB allocation by obtaining information from the HMB allocation response 632 that indicates whether a requested HMB allocation for a respective internal module was successful. In other aspects, the memory controller 123 may retain a bitmap indicating which internal modules have been using their respective HMB allocations.

At 906, the memory controller 123 determines whether the region in the volatile memory 118 that is associated with the HMB allocation for the respective module is reused. For example, a region in the volatile memory 118 freed by the HMB allocation that is determined to be sufficient for the memory controller 123 to reuse may be marked in a bitmap by the memory controller 123. If the region in the volatile memory 118 is determined to be reused, then the process 900 proceeds to block 908. Otherwise, the process 900 proceeds to block 910.

At 908, the memory controller 123 may evict all sets of data from the reused region in the volatile memory 118 when the memory controller 123 determines that the subject region in the volatile memory 118 is reused. In other aspects, the memory controller 123 may evict all sets of data from extended volatile memory (e.g., RAM) region for host read and write buffers. At 910, the memory controller 123 releases the allocated HMB back to the host device 104.

Figure 10B:
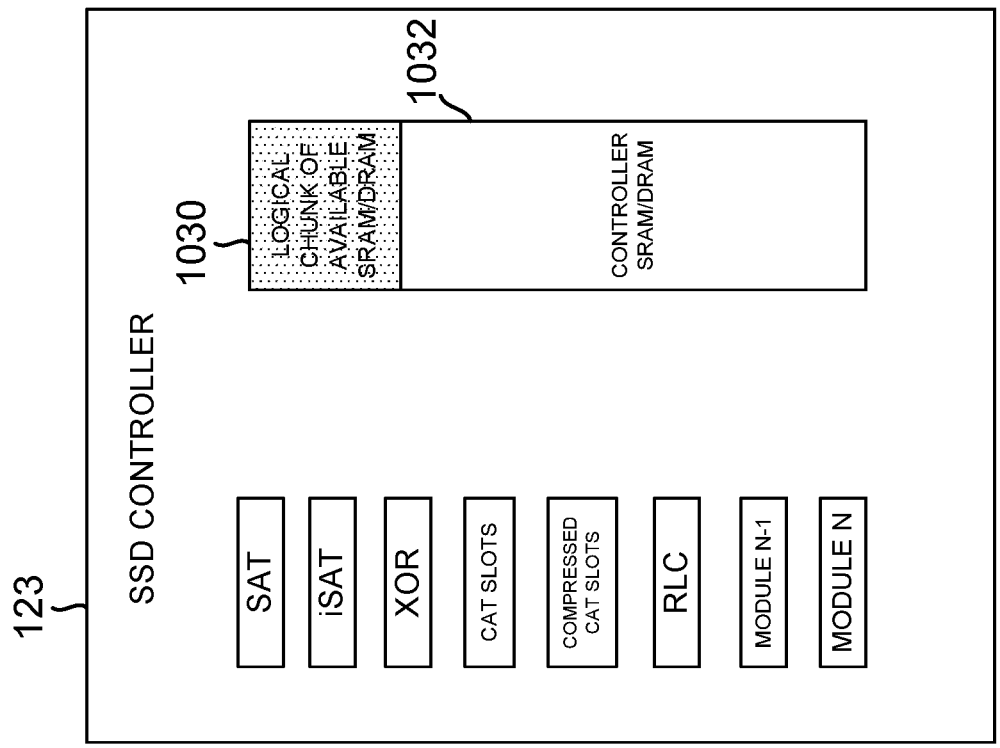
FIGS. 10A and 10B are conceptual diagrams illustrating an example of memory handling in the storage device of FIG. 1.
Figure 10A:
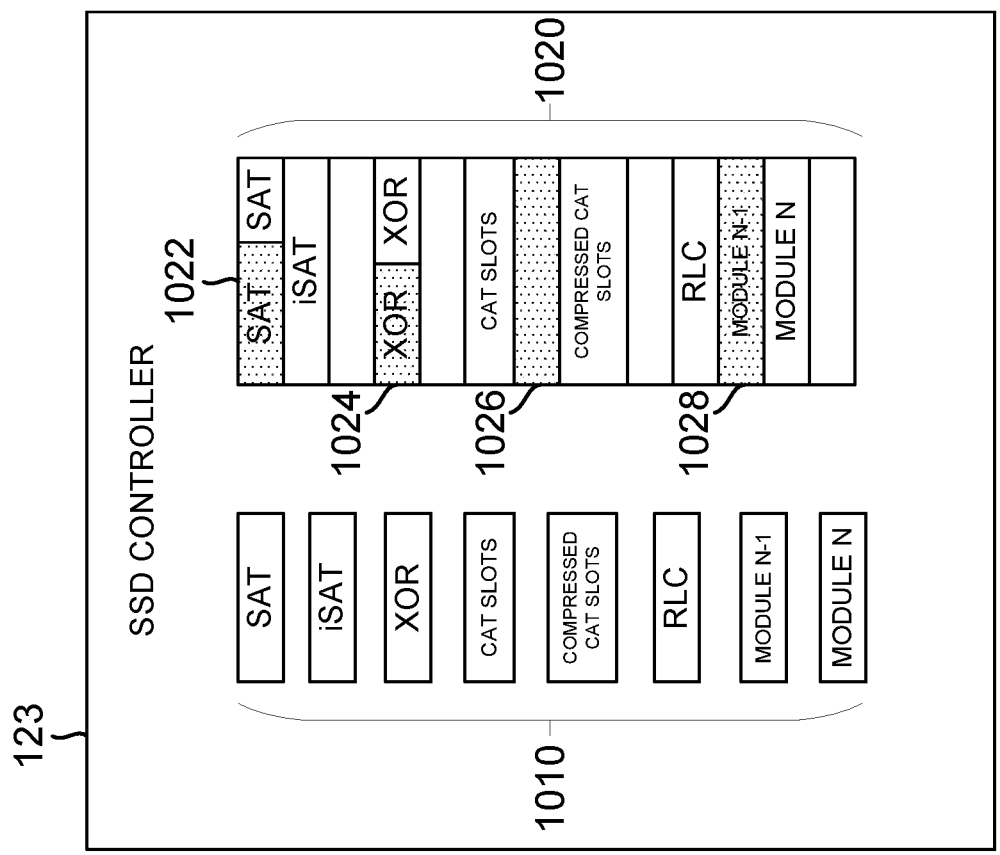

FIGS. 10A and 10B are conceptual diagrams illustrating an example of volatile memory handling in the storage device 102 of FIG. 1. In FIG. 10A, the memory controller 123 includes one or more internal modules that are configured to perform specific storage device operations. For example, the memory controller 123 includes multiple internal modules such as SAT, iSAT, XOR, CAT slots, compressed CAT slots, RLC, among other modules (e.g., module N−1, module N), where N is predefined number of modules of the memory controller 123. For example, a SAT may refer to a logical-to-physical address map. An iSAT may refer to a physical-to-logical address map. A garbage collection algorithm can also use a physical-to-logical address map to identify which memory blocks need to be relocated. The physical-to-logical address map will sometimes be referred to herein as a "reverse map" or iSAT. In other examples, the XOR or "exclusive OR" is a reliability enhancement that can increase the reliability of NAND components. The XOR scheme is named after the Boolean logical function and allows replacement of up to an entire defective NAND die in a component through XOR operations. The XOR scheme can provide protection against die failure and extrinsic Uncorrectable Bit Error Rate (UBER) events by replacing entire or defective portions of a NAND die array utilizing a spare NAND die array that can be built with reconstructed data via the XOR parity data bits. The XOR scheme's primary goal in an SSD is to reduce any catastrophic data loss failure and average failure rate. This is accomplished using the Boolean XOR logical function that A XOR B XOR B=A. The XOR-ing of incoming data packets from the host generates XOR parity bits that later can be used to rebuilt data if needed. By storing the result of A XOR B as parity data, the scheme allows A or B to be recreated by XOR-ing the parity data with A (to recreate B) or B (to recreate A).

As depicted in FIG. 10A, the volatile memory 118 includes allocated regions that are assigned to respective internal modules. During HMB allocation, these allocated regions may be freed in their entirety or partially. For example, the SAT internal module may be allocated a first region in the volatile memory 118 that includes a freed region 1022, the XOR internal module may be allocated a second region in the volatile memory 118 that includes a freed region 1024, the CAT slots internal module may be allocated a third region in the volatile memory 118 that includes a freed region 1026, and another internal module (e.g., module N−1) may be allocated a fourth region in the volatile memory 118 that includes a freed region 1028. Each of the freed regions 1022, 1024, 1026, 1028 may be non-contiguous to one another and correspond to assigned memory regions of the respective internal module. In some aspects, each of the freed regions may be referred to as a chunk of freed memory.

In FIG. 10B, the memory controller 123 may determine that multiple modules of the memory controller 123 received allocation of the HMB 770 for their internal operations. The HMB handling module 750 of the memory controller 123 may combine all chunks of freed volatile memory into one logical chunk and use the combined chunk of freed memory effectively for improving host read performance. For example, the HMB handling module 750 may combine the freed regions 1022, 1024, 1026, 1028 into a contiguous logical chunk of available volatile memory 1030. The remainder regions of the volatile memory 118 may be reorganized to form a logical chunk of used volatile memory 1032.

Figure 11:
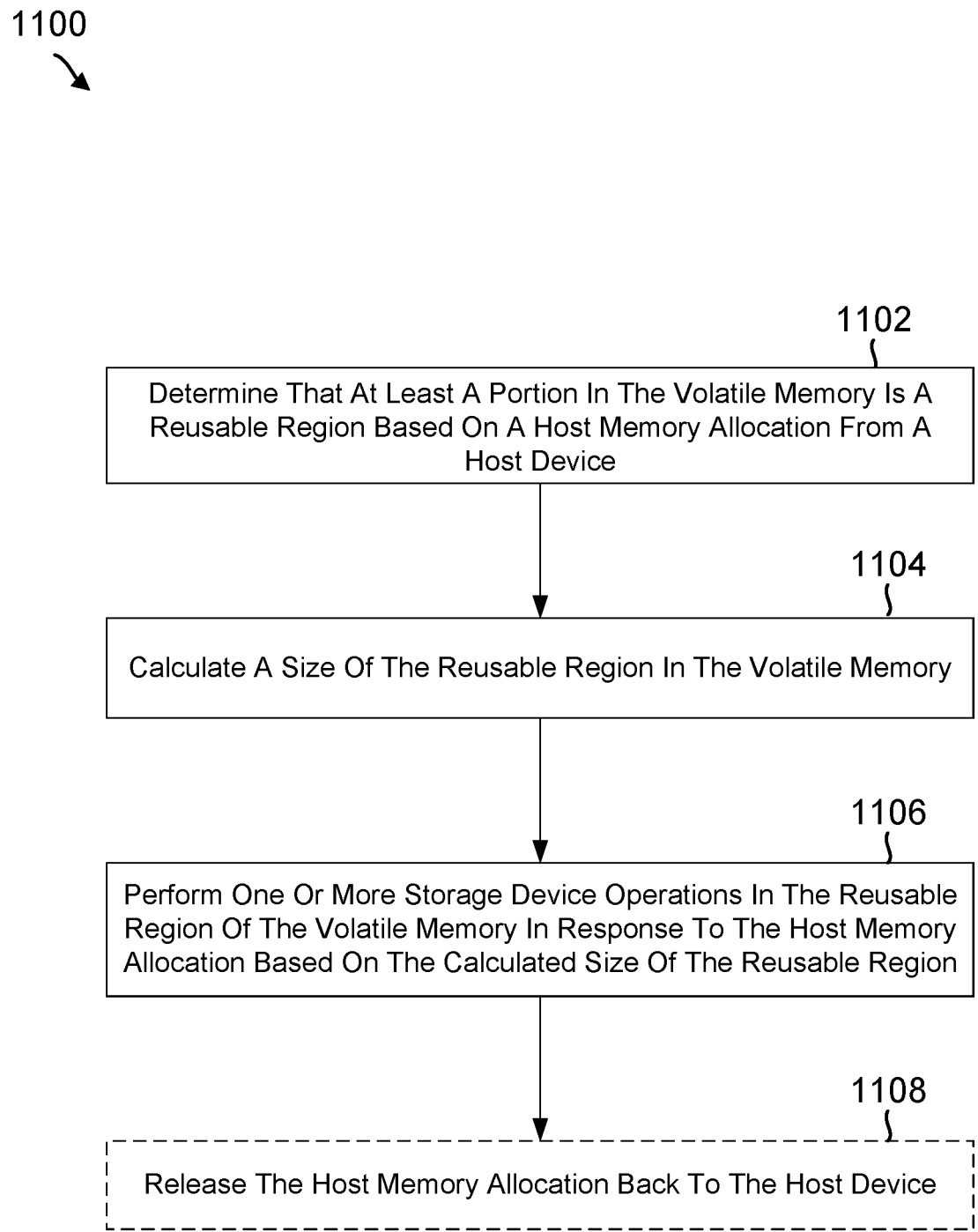
FIG. 11 is a flow chart illustrating a process for handling of host memory buffer allocation, as performed by the storage device of FIG. 1.

FIG. 11 is a flow chart illustrating a process 1100 for handling of host memory buffer allocation, as performed by the storage device of FIG. 1. For example, the process 1100 can be carried out in a storage device 102 such as the one illustrated in FIG. 1. Each of the steps in the flow chart can be controlled using the controller as described below (e.g. controller 123), by a component or module of the controller, or by some other suitable means.

As represented by block 1102, the controller 123 may determine that at least a portion in the volatile memory is a reusable region based on a host memory allocation from a host device 114. For example, referring to FIGS. 1, 7, 8 and 9, the controller 123 may determine whether the storage device supports HMB allocation. The controller 123 also may send, to a host device, a request for a HMB allocation for one or more internal modules associated with the controller, when the storage device is determined to support the HMB allocation. The controller 123 also may receive, from the host device, a response indicating whether the HMB allocation is successful. The controller 123 also may allocate the reusable region in the volatile memory that corresponds to the host memory allocation for an internal module of the controller from a total host memory allocation based on a corresponding priority of the internal module. The controller 123 also may fetch the allocated region in the volatile memory for the internal module. In the determination that the at least a portion in the volatile memory is reusable, the controller 123 may calculate a first amount of memory freed in the at least a portion of the volatile memory based on the host memory allocation, and may determine a second amount of memory used to perform a storage device operation associated with an internal module of the controller, such that the controller 123 may determine that the first amount of memory is greater than the second amount of memory to conclude that the freed region is reusable.

As represented by block 1104, the controller 123 may calculate a size of the reusable region in the volatile memory. As represented by block 1106, the controller 123 may perform one or more storage device operations in the reusable region of the volatile memory in response to the host memory allocation based on the calculated size of the reusable region.

As represented by block 1108, the controller 123 may release the host memory allocation back to the host device 114. The controller 123 also may determine to release an allocated region of the host memory that corresponds to the host memory allocation. The controller 123 may identify which of one or more internal modules associated with the controller are using the allocated region of the host memory, and determine whether the reusable region in the volatile memory associated with the host memory allocation is reused by an identified internal module. The controller 123 also may evict one or more sets of data from the reusable region of the volatile memory when the reusable region in the volatile memory is determined to be reused.

Figure 12:
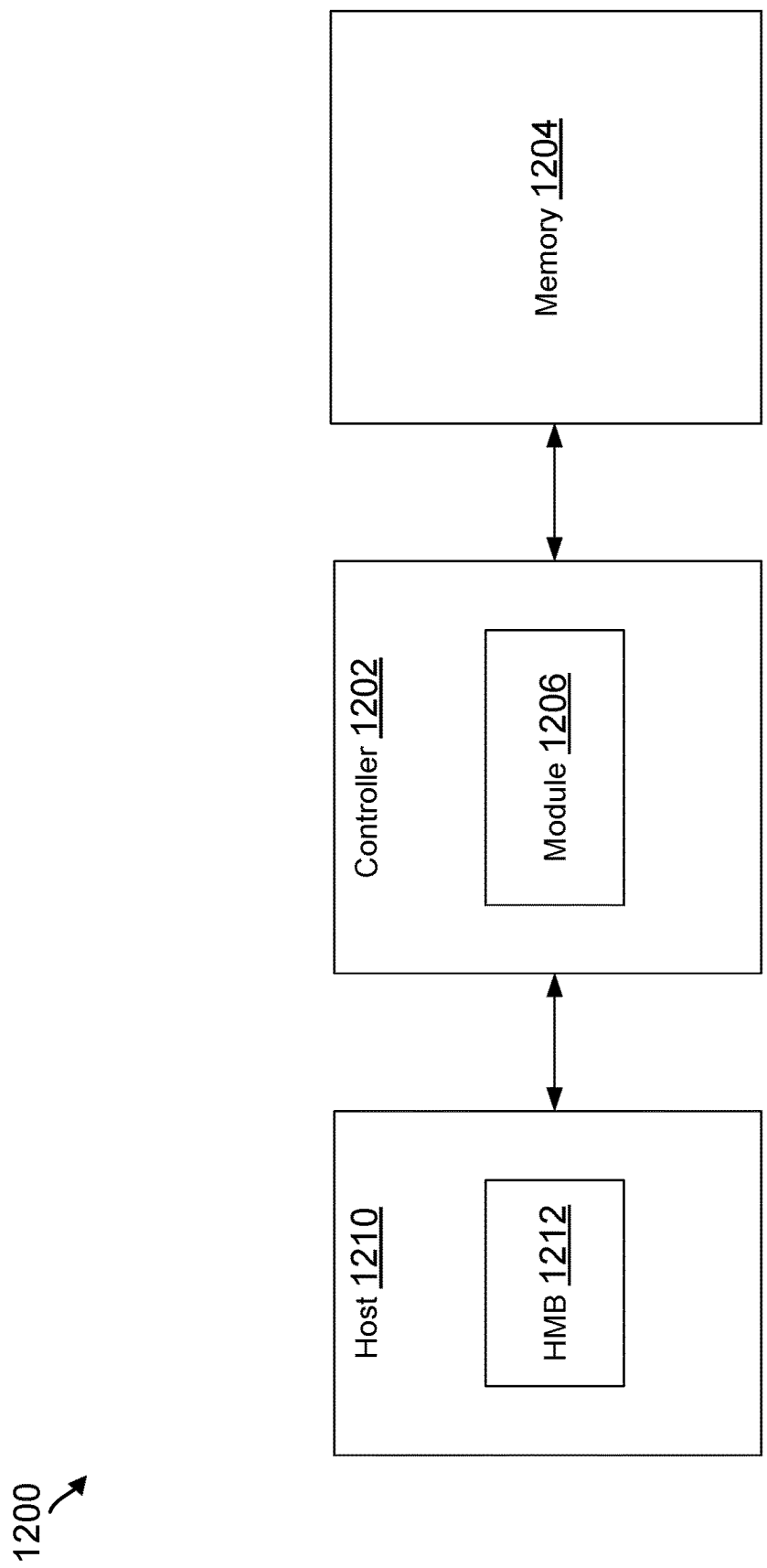
FIG. 12 is a conceptual diagram illustrating an example of a controller that handles host memory buffer allocation in the storage device of FIG. 1.

FIG. 12 is a conceptual diagram 1200 illustrating an example of a controller 1202 that handles host memory buffer allocation in the storage device 102 of FIG. 1. The controller 1202 is coupled to a memory 1204 in a storage device. The controller 1202 may include module 1206. For example, controller 1202 may correspond to controller 123 and memory 1204 may correspond to the volatile memory 128 of the storage device 102 in FIG. 1. The module 1206 may correspond to the HMB handling module 750. The controller 1202 is also coupled to a host 1210 that includes HMB 1212. For example, the host 1210 may correspond to the host device 104 and the HMB 1212 may correspond to the HMB 770. The controller 1202 may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 1202 may include a module 1206 that may provide a means for determining that at least a portion in the volatile memory is a reusable region based on a host memory allocation with a host device. For example, the module 1206 may perform the aforementioned process described at 1102. In one configuration, the module 1206 may provide means for calculating a size of the reusable region in the volatile memory, e.g., as described in connection with 1104. In one configuration, the module 1206 may provide means for performing one or more storage device operations in the reusable region of the volatile memory in response to the host memory allocation based on the calculated size of the reusable region, e.g., as described in connection with 1106. The controller 1202 also may provide a means for releasing the allocated region of the host memory back to the host device, e.g., as described in connection with 1108.

Accordingly, the controller described in the present disclosure improves read and/or write performance of the storage device by the effective reuse of internal volatile memory during HMB allocation. For instance, the controller can load additional sets of data (e.g., logical mapping of chunk of logical block addresses of host data), inverse storage address tables, relocation information (e.g., garbage collection), among others. In this way, the controller may send a request to a host device for HMB allocation for any of its internal modules to handle efficiently. Accordingly, improvements in SSD read and write performance may be accomplished with minimal changes to controller logic and/or interface to the internal memory and host device.

The various aspects of this disclosure are provided to enable one of ordinary skill in the art to practice the present disclosure. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory including a volatile memory; and
   a controller configured to:
      determine that at least a portion in the volatile memory is a reusable region based on a host memory allocation from a host device;
      calculate a size of the reusable region in the volatile memory; and
      perform one or more storage device operations in the reusable region of the volatile memory in response to the host memory allocation based on the calculated size of the reusable region.

2. The storage device of claim 1, wherein the controller is further configured to determine whether the storage device supports host memory buffer (HMB) allocation.

3. The storage device of claim 2, wherein the controller is further configured to:
   send, to the host device, a request for the HMB allocation for one or more internal modules associated with the controller, in response to the storage device being determined to support the HMB allocation; and
   receive, from the host device, a response indicating whether the HMB allocation is successful.

4. The storage device of claim 1, wherein the controller is further configured to:
   allocate, from the host memory allocation, the reusable region in the volatile memory for an internal module of the controller based on a corresponding priority of the internal module; and
   fetch the allocated reusable region in the volatile memory for the internal module.

5. The storage device of claim 1, wherein the determination that the at least a portion in the volatile memory is reusable comprises to:
   calculate a first amount of memory freed in the at least a portion of the volatile memory based on the host memory allocation;
   determine a second amount of memory used to perform the one or more storage device operations associated with an internal module of the controller; and
   determine that the first amount of memory is greater than the second amount of memory.

6. The storage device of claim 1, wherein the performance of the one or more storage device operations comprises to load one or more of an inverse storage address table information or relocation information associated with a garbage collection operation in the reusable region of the volatile memory.

7. The storage device of claim 1, wherein the performance of the one or more storage device operations comprises to load one or more mapping tables in the reusable region of the volatile memory associated with the one or more storage device operations.

8. The storage device of claim 7, wherein the one or more storage device operations comprises one or more of a random read operation, a sequential read operation, a random write operation, a sequential write operation or a relocation operation.

9. The storage device of claim 1, wherein the performance of the one or more storage device operations comprises to allocate one or more host buffers associated with the one or more storage device operations in the reusable region of the volatile memory.

10. The storage device of claim 1, wherein the controller is further configured to:
determine to release an allocated region of a host memory that corresponds to the host memory allocation;
identify one or more internal modules associated with the controller which are using the allocated region of the host memory;
determine whether the reusable region in the volatile memory associated with the host memory allocation is reused by the identified one or more internal modules;
evict one or more sets of data from the reusable region of the volatile memory when the reusable region is determined to be reused; and
release the allocated region of the host memory to the host device.

11. A storage device, comprising:
a memory including a volatile memory; and
a controller configured to:
determine that at least a portion in the volatile memory is a reusable region based on a host memory allocation from a host device;
calculate a size of the reusable region in the volatile memory;
perform one or more storage device operations in the reusable region of the volatile memory in response to the host memory allocation based on the calculated size of the reusable region; and
release the host memory allocation to the host device.

12. The storage device of claim 11, wherein the controller is further configured to determine whether the storage device supports host memory buffer (HMB) allocation.

13. The storage device of claim 12, wherein the controller is further configured to:
send, to the host device, a request for the HMB allocation for one or more internal modules associated with the controller, in response to the storage device being determined to support the HMB allocation; and
receive, from the host device, a response indicating whether the HMB allocation is successful.

14. The storage device of claim 11, wherein the controller is further configured to:
allocate, from the host memory allocation, the reusable region in the volatile memory for an internal module of the controller based on a corresponding priority of the internal module; and
fetch the allocated reusable region in the volatile memory for the internal module.

15. The storage device of claim 11, wherein the controller is further configured to:
determine to release an allocated region of a host memory that corresponds to the host memory allocation;
identify one or more internal modules associated with the controller which are using the allocated region of the host memory;
determine whether the reusable region in the volatile memory associated with the host memory allocation is reused by the identified one or more internal modules; and evict one or more sets of data from the reusable region of the volatile memory when the reusable region is determined to be reused.

16. The storage device of claim 11, wherein the performance of the one or more storage device operations comprises to load one or more mapping tables in the reusable region of the volatile memory associated with the one or more storage device operations, and wherein the one or more storage device operations comprises one or more of a random read operation, a sequential read operation, a random write operation, a sequential write operation or a relocation operation.

17. A storage device, comprising:
a memory including a volatile memory; and
a controller configured to:
determine whether the storage device supports host memory buffer (HMB) allocation;
send, to a host device, a request for the HMB allocation for one or more internal modules associated with the controller, in response to the storage device being determined to support the HMB allocation;
receive, from the host device, a response indicating whether the HMB allocation is successful;
determine that at least a portion in the volatile memory is a reusable region when the HMB allocation with the host device is successful;
calculate a size of the reusable region in the volatile memory;
perform one or more storage device operations in the reusable region of the volatile memory in response to the HMB allocation based on the calculated size of the reusable region; and
release the HMB allocation back to the host device.

18. The storage device of claim 17, wherein the controller is further configured to:
allocate, from the HMB allocation, the reusable region in the volatile memory for an internal module of the controller based on a corresponding priority of the internal module; and
fetch the allocated reusable region in the volatile memory for the internal module.

19. The storage device of claim 17, wherein the determination that the at least a portion in the volatile memory is reusable comprises to:
calculate a first amount of memory freed in the at least a portion of the volatile memory based on the HMB allocation;
determine a second amount of memory used to perform the one or more storage device operations associated with an internal module of the controller; and
determine that the first amount of memory is greater than the second amount of memory.

20. The storage device of claim 17, wherein the controller is further configured to:
determine to release an allocated region of a host memory that corresponds to the HMB allocation;
identify one or more internal modules associated with the controller which are using the allocated region of the host memory;
determine whether the reusable region in the volatile memory associated with the HMB allocation is reused by the identified one or more internal modules; and
evict one or more sets of data from the reusable region of the volatile memory when the reusable region is determined to be reused.

* * * * *